United States Patent
Vyas et al.

(10) Patent No.: US 8,211,592 B2
(45) Date of Patent: Jul. 3, 2012

(54) HYDROPHILIC LAYER ON FLOWFIELD FOR WATER MANAGEMENT IN PEM FUEL CELL

(75) Inventors: Gayatri Vyas, Rochester Hills, MI (US); Youssef M. Mikhail, Sterling Heights, MI (US); Thomas A. Trabold, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1911 days.

(21) Appl. No.: 11/227,312

(22) Filed: Sep. 15, 2005

(65) Prior Publication Data

US 2008/0044715 A1    Feb. 21, 2008

(51) Int. Cl.
*H01M 8/10* (2006.01)
*H01M 8/04* (2006.01)

(52) U.S. Cl. ......... 429/514; 429/513; 429/512; 429/483

(58) Field of Classification Search .................... 429/34, 429/414, 457, 530, 514, 513, 512, 483
See application file for complete search history.

(56) References Cited

U.S. PATENT DOCUMENTS

| | | | |
|---|---|---|---|
| 4,933,060 A | 6/1990 | Prohaska et al. | |
| 4,946,903 A | 8/1990 | Gardella, Jr. et al. | |
| 5,282,965 A | 2/1994 | Urairi et al. | |
| 5,462,781 A | 10/1995 | Zukowski | |
| 5,942,347 A * | 8/1999 | Koncar et al. | 429/30 |
| 6,291,093 B1 * | 9/2001 | Kindler et al. | 429/450 |
| 6,291,094 B1 * | 9/2001 | Yoshimura et al. | 429/492 |
| 6,432,510 B1 * | 8/2002 | Kim et al. | 428/142 |
| 6,780,497 B1 | 8/2004 | Walter | |
| 2002/0071978 A1 * | 6/2002 | Bekkedahl et al. | 429/25 |
| 2002/0107140 A1 * | 8/2002 | Hampden-Smith et al. | 502/185 |
| 2002/0187379 A1 | 12/2002 | Yasuo et al. | |
| 2003/0175523 A1 * | 9/2003 | Moya | 428/421 |
| 2004/0110058 A1 * | 6/2004 | Lee et al. | 429/40 |
| 2005/0084731 A1 | 4/2005 | Nishimura et al. | |

FOREIGN PATENT DOCUMENTS

| | | | |
|---|---|---|---|
| EP | 975 040 | * | 1/2000 |
| EP | 1 098 380 | | 5/2001 |
| JP | 06-084532 | | 3/1994 |
| JP | 07-240221 | | 12/1995 |
| JP | 2000-012048 | | 1/2000 |
| JP | 2000-259051 | | 9/2000 |
| JP | 2002-170580 | | 6/2002 |
| JP | 2003-522225 | | 7/2003 |
| JP | 2004-139854 | | 5/2004 |
| WO | WO 01/58577 | | 8/2001 |
| WO | WO2004/010086 A2 | | 1/2004 |
| WO | WO 2004/051764 | | 6/2004 |
| WO | WO 2004/100286 | | 11/2004 |

* cited by examiner

Primary Examiner — Helen O Conley

(57) ABSTRACT

A fluid distribution element is provided for a fuel cell having a major surface facing a membrane electrode assembly (MEA) and one or more flow channels for transporting gas and liquid to and from the MEA. One or more regions of the major surface are overlaid with a super-hydrophilic corrosion-resistant layer comprising a fluoropolymer. Methods of making such a fluid distribution element are also provided.

9 Claims, 5 Drawing Sheets

Control – Hydrophobic Carbon 1S

Example 1 – Hydrophilic Carbon 1S

HYDROPHILIC LAYER ON FLOWFIELD FOR WATER MANAGEMENT IN PEM FUEL CELL

FIELD OF THE INVENTION

The present invention relates to an electrochemical fuel cell, and more particularly to an electroconductive fluid distribution element within a fuel cell and methods for producing the electroconductive element.

BACKGROUND OF THE INVENTION

Fuel cells have been proposed as a power source for electric vehicles and other applications. An exemplary fuel cell has a membrane electrode assembly (MEA) with catalytic electrodes and a proton exchange membrane (PEM) sandwiched between the electrodes. Water is generated at the cathode electrode based on the electrochemical reactions between hydrogen and oxygen occurring within the MEA. Efficient operation of a fuel cell depends on the ability to provide effective water management in the system, for example to control transport of water away from generation sites on the cathode to prevent water build up from blocking flow channels and flooding of the fuel cell.

During operation of a fuel cell at low power loads, product water may accumulate in the channels of the reactant flow fields, particularly on the cathode side. Water accumulation may lead to blocked fluid flow (so called "flooding") which potentially leads to instability of a portion of a fuel cell. Various means of circumventing this potential problem have been explored and have included altering the physical characteristics of the channels, specifically the channel geometry, including size and shape. Thus, optimum fuel cell performance relates to efficient water management. There remains a need for improved water management to improve fuel cell performance, efficiency, and life span.

SUMMARY OF THE INVENTION

In one aspect the present invention relates to a fluid distribution element for a fuel cell comprising: an impermeable element having a major surface facing a membrane electrode assembly (MEA). One or more regions of the major surface are overlaid with a super-hydrophilic corrosion-resistant layer comprising a fluoropolymer.

In another aspect, the present invention relates to a method for manufacturing a fluid distribution element having one or more regions overlaid with a hydrophilic polymeric layer for a fuel cell. The method comprises applying polytetrafluroethylene (PTFE) to one or more regions of a major surface of the fluid distribution element for the fuel cell. A surface of the applied polymer is treated to impart hydrophilicity thereto.

In yet another aspect, the present invention relates to a fuel cell comprising a membrane electrode assembly (MEA). The fluid distribution element has a major surface facing the MEA. The major surface defines one or more flow channels for transporting gas and liquid to and from the MEA. At least a portion of said flow channels are overlaid with a hydrophilic corrosion-resistant layer comprising polytetrafluoroethylene (PTFE).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
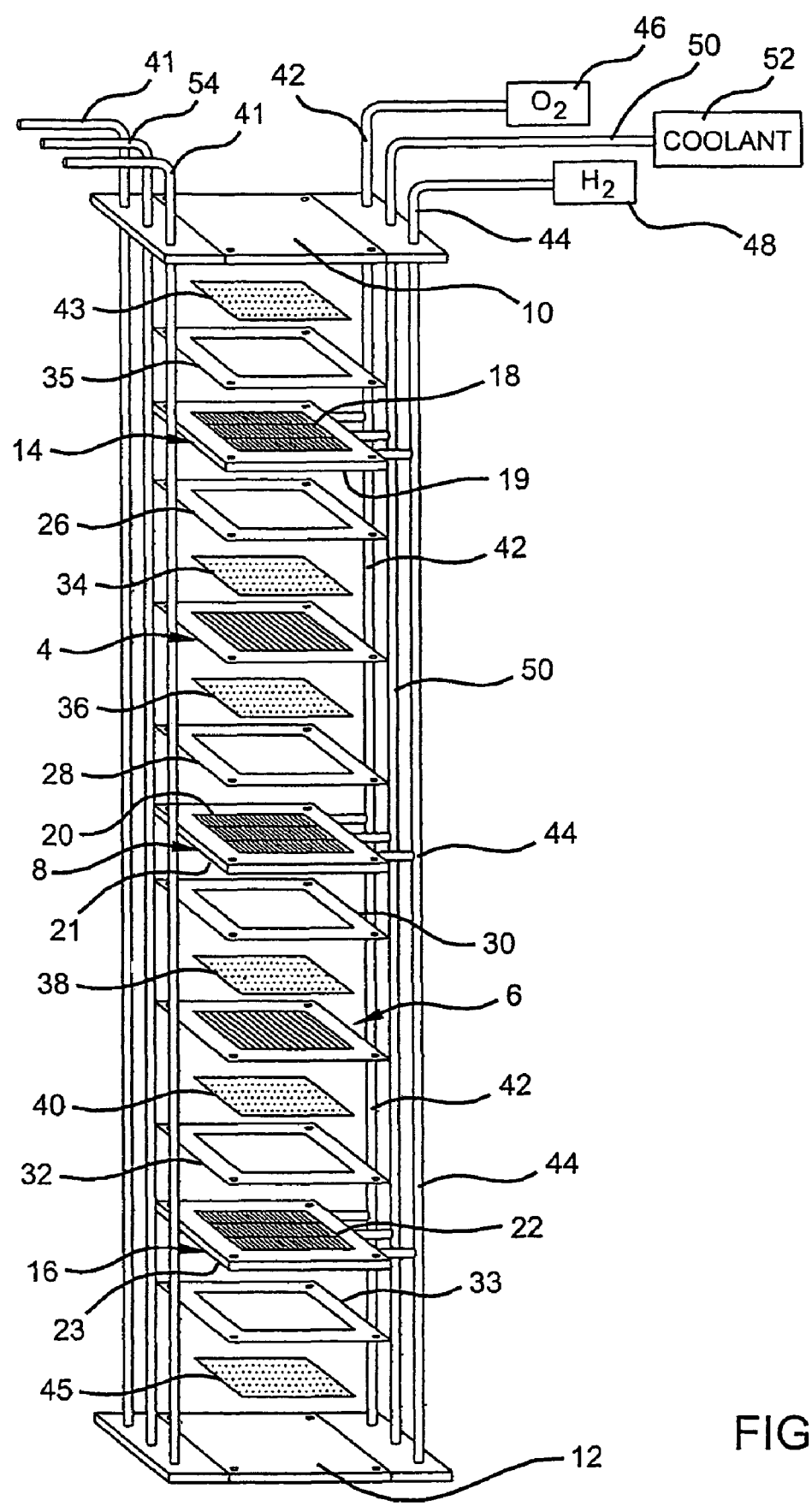
FIG. 1 is a schematic, exploded, isometric, illustration of an exemplary liquid-cooled PEM fuel cell stack (only two cells shown)

The following description of the preferred embodiments is merely exemplary in nature and is in no way intended to limit the invention, its application, or uses.

In order to achieve stable PEM fuel cell operation over a wide range of loads and operating conditions, it is necessary to properly manage fluid flow, and more particularly liquid flow, in a fuel cell. For example, liquid water is produced by the cathodic oxygen reduction reaction which occurs during operation of an electrochemical fuel cell and must be effectively circulated and removed to maintain stable reactions. A key factor related to fuel cell operation is water transportation and preventing undesired accumulation of water in a fuel cell. Thus, the ability to expel water from flow field channels at various levels of gas velocities and operating conditions is important to fuel cell operations. For instance, under low load conditions near 0.1 A/cm$^2$, water accumulation in flow field "U-bends" and curves contributes to low performing cell behavior. This leads to one or more cells within a stack experiencing a rapid drop in voltage. In this case, the gas inertia is not sufficient to expel large liquid slugs around 180° bends toward the cathode exhaust header. This potential accumulation may result in entire channels being starved of oxygen. To address such issues, the present invention contemplates a fluid distribution element having a flow field with flow channels that have a high surface free energy (hydrophilic) that in conjunction with channel geometry design improves fuel cell operations by effectively removing water to maintain stable performance at low gas velocities.

Liquid accumulation as described herein is, in essence, a pooling of liquid water formed primarily at the cathode. Water management can also be an issue on the anode side, due to electro-osmotic drag across the membrane, for example. The present invention provides an electroconductive fluid distribution element (e.g., a bipolar plate or a terminal plate) for use in a fuel cell that has improved water management and excellent stability and corrosion-resistance in a fuel cell. The element preferably has a major surface having a fluid flow field formed therein, and a highly hydrophilic corrosion-resistant layer comprising a fluoropolymer overlaying or applied to one or more regions of the flow field. According to the present invention, the hydrophilic corrosion-resistant layer improves water management, and hence the life span of the fuel cell, by reducing liquid accumulation on the coated region(s) of the flow field as compared to the liquid accumulation over an uncoated region of the surface. Further, the hydrophilic layer according to the various embodiments of the present invention is highly stable and inert in the harsh fuel cell environment, thus it is corrosion-resistant, and further contributes to a lengthened life span for the fuel cell.

"Hydrophilic" as used herein is a relative material characteristic as compared to a reference material and pertains to a surface property where water spreads easily on the surface. Wettability is the process of one fluid displacing another on a solid surface, such as water displacing air. The wettability of a surface is categorized by the measurement of the contact angle, or the angle formed at the contact line between a drop and a surface. For contact angles less than 90 degrees, a surface is considered hydrophilic, and for those greater than 90 degrees, hydrophobic.

The influence of roughness on wettability depends on whether the substrate surface is hydrophobic or hydrophilic. Governed by Wenzel's Law, as is known by one skilled in the art, when a surface is roughened, the contact angle, or wettability, is modified. As the roughness is increased, the wettability increases for hydrophilic surfaces, and conversely decreases for hydrophobic surfaces. Thus, as the surface is made rougher a hydrophilic surface becomes more wettable (reducing the contact angle). Thus, a highly porous and rough surface further enhances the hydrophilic characteristics of a hydrophilic polymeric surface.

Contact angle measurements of liquids on solid surfaces are either static or dynamic. Static contact angles are typically measured by the sessile drop method. Dynamic contact angles can be measured by a variety of well-known tests; one such test is the Wilhelmy method using a dip procedure to determine advancing and receding contact angles. Sessile drop method static contact angles are generally determined by averaging the measured contact angles at opposite sides of a drop. Advancing and receding contact angles are determined by the Wilhelmy method, where a test specimen is dipped into a liquid and the contact angle is determined from the wetting force obtained as the sample is submerged into the liquid; conversely the receding angle is determined by removing the test specimen from the liquid and determining the wetting force obtained as the sample is removed from the liquid. Advancing and receding angles can be calculated by the Wilhelmy equation: $\cos \theta = F_w / l\sigma$ where $\Theta$ is the contact angle, l is the test specimen's perimeter, a is the surface tension of the liquid, and $F_w$ is the Wilhelmy force, generally recognized to be the difference between the total force experienced by the specimen at any submersion position and the buoyant force.

In accordance with various embodiments of the present invention, a "super-hydrophilic" fluoropolymer preferably has a static contact angle of less than about 45°, more preferably less than about 30°, even more preferably less than about 20°. In particularly preferred embodiments, a super-hydrophilic fluoropolymer has a static contact angle of less than or equal to about 15°. In some embodiments, a super-hydrophilic fluoropolymer has a static contact angle of less than or equal to about 10°. Likewise, a super-hydrophilic polymer in accordance with the present invention preferably has both advancing and receding contact angles—measured using the Wilhelmy plate method—of less than about 45°, preferably less than about 30°, preferably less than or equal to about 20°, preferably less than or equal to about 15°, and more preferably less than or equal to about 10°. For example, one preferred polymer for use in accordance with the present invention, has a static contact angle of 15°, an advancing contact angle of 7° and a receding contact angle of 0°, as will be described in more detail below.

To gain a better understanding of the present invention, an exemplary fuel cell where the present invention may be employed is shown in FIG. 1, which depicts two individual proton exchange membrane (PEM) fuel cells connected to form a stack having a pair of membrane electrode assemblies (MEAs) 4, 6 and gas diffusion media 34, 36, 38, 40 separated from each other by an electrically conductive, liquid cooled, bipolar separator plate or conductive element 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21 respectively facing a separate MEA 4, 6 with opposite charges that are separated, hence the so called "bipolar" plate. As described herein, the fuel cell stack is described as having conductive bipolar plates.

The MEAs 4, 6 and bipolar plate 8 are stacked together between stainless steel clamping terminal plates 10, 12 and end contact fluid distribution elements 14, 16. The end fluid distribution elements 14, 16, as well as both working faces or sides 20, 21 of the bipolar plate 8, contain a plurality of lands adjacent to grooves or channels on the active faces 18, 19, 20, 21, 22 and 23 for distributing fuel and oxidant gases (i.e, $H_2$ and $O_2$) to the MEAs 4, 6. Nonconductive gaskets or seals 26, 28, 30, 32, 33 and 35 provide seals and electrical insulation between the several components of the fuel cell stack. Gas permeable conductive diffusion media 34, 36, 38 and 40 press up against the electrode faces of the MEAs 4, 6. Additional layers of conductive media 43, 45 are placed between the end contact fluid distribution elements 14, 16 and the terminal collector plates 10, 12 to provide a conductive pathway therebetween when the stack is compressed during normal operating conditions. The end contact fluid distribution elements 14, 16 press up against the diffusion media 34, 43 and 40, 45 respectively.

Oxygen is supplied to the cathode side of the fuel cell stack from storage tank 46 via appropriate supply plumbing 42, while hydrogen is supplied to the anode side of the fuel cell from storage tank 48 via appropriate supply plumbing 44. Alternatively, air may be supplied to cathode side from the ambient, and hydrogen to the anode from a methanol or gasoline reformer or the like. Exhaust plumbing 41 for both the $H_2$—$O_2$/air sides of the MEAs is also provided. Additional plumbing 50 is provided for circulating coolant from a storage area 52 through the bipolar plate 8 and end plates 14, 16 and out the exit plumbing 54.

During fuel cell operation, the anode hydrogen gas ($H_2$) is split into two protons ($H^+$), thus freeing two electrons. The protons migrate across the membrane of the MEA 4, 6 to the cathode side. The oxygen or air introduced at the cathode side flows into the porous electrode. Catalyst particles within the cathode facilitate a reaction between the protons ($H^+$) and oxygen ($O_2$), to form water within the electrode. Thus, as liquid water is generated, the gas flow into the porous cathode material must simultaneously be maintained. Otherwise the electrode has the potential to "flood" with liquid. Flooding impedes gas flow to the PEM through the MEA 4, 6 in effect decreasing or ceasing any reactions occurring at the MEA 4, 6. One embodiment of the present invention provides the fluid distribution element adjacent to the cathode that facilitates water and cathode effluent transportation away from the cathode, while further humidifying the PEM, and in some embodiments, even cooling the fuel cell. Another embodiment of the present invention provides a first fluid distribution element on the cathode side of an MEA 4,6 having a hydrophilic layer and a second fluid distribution element on an anode side of the MEA 4,6 also has hydrophilic layers to improve water management of both sides of the MEA 4,6.

Figure 2:
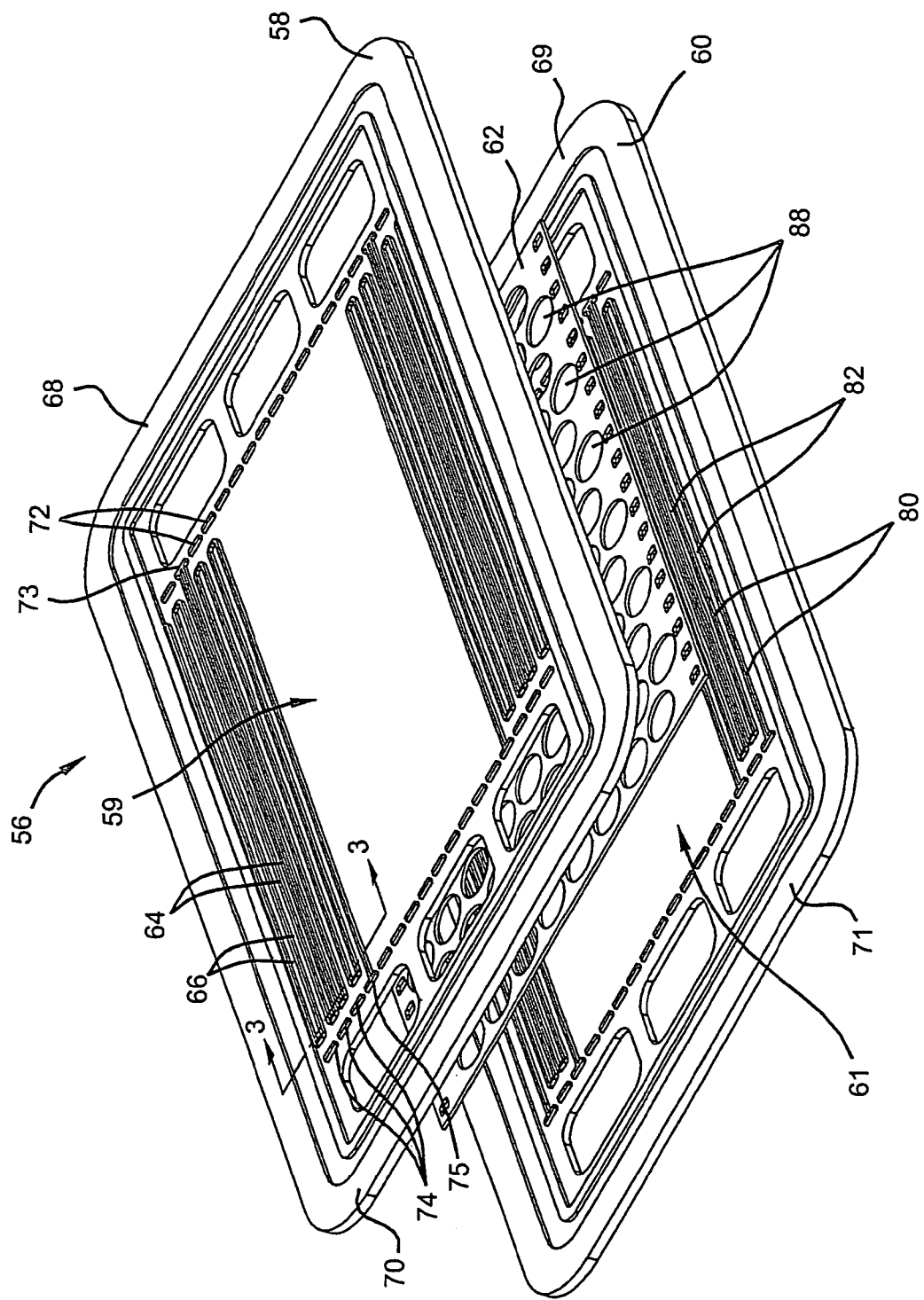
FIG. 2 is an exploded, isometric view of a bipolar plate useful with PEM fuel cell stacks like that illustrated in FIG. 1.

FIG. 2 is an isometric, exploded view of a bipolar plate 56 comprising a first exterior sheet 58, a second exterior sheet 60, and an interior spacer sheet 62 interjacent the first sheet 58 and the second sheet 60. The exterior sheets 58, 60 are made as thin as possible (e.g., about 0.002-0.02 inches thick), which may be formed by stamping, by photo etching (i.e., through a photolithographic mask) or any other conventional process for shaping sheet metal or forming polymeric matrices. The external sheet 58 has a first major surface 59 on the outside thereof which confronts a membrane-electrode-assembly (not shown) and is formed so as to provide a plurality of lands 64 which define therebetween a plurality of grooves 66 that are flow channels or a "flow field" through which the fuel cell's reactant fluids (e.g., $H_2$, air or $O_2$) flow in a tortuous path from one side 68 of the bipolar plate to the other side 70 thereof.

When the fuel cell is fully assembled, the lands 64 press against the carbon/graphite paper gas diffusion media (such as 36 or 38 in FIG. 1) which, in turn, press against the MEAs (such as 4 or 6 in FIG. 1, respectively). For drafting simplicity, FIG. 2 depicts only two arrays of lands 64 and grooves 66. In reality, the lands and grooves 64, 66 will cover the entire external surfaces of the sheets 58, 60 that engage the carbon/graphite papers. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell.

Figure 3:
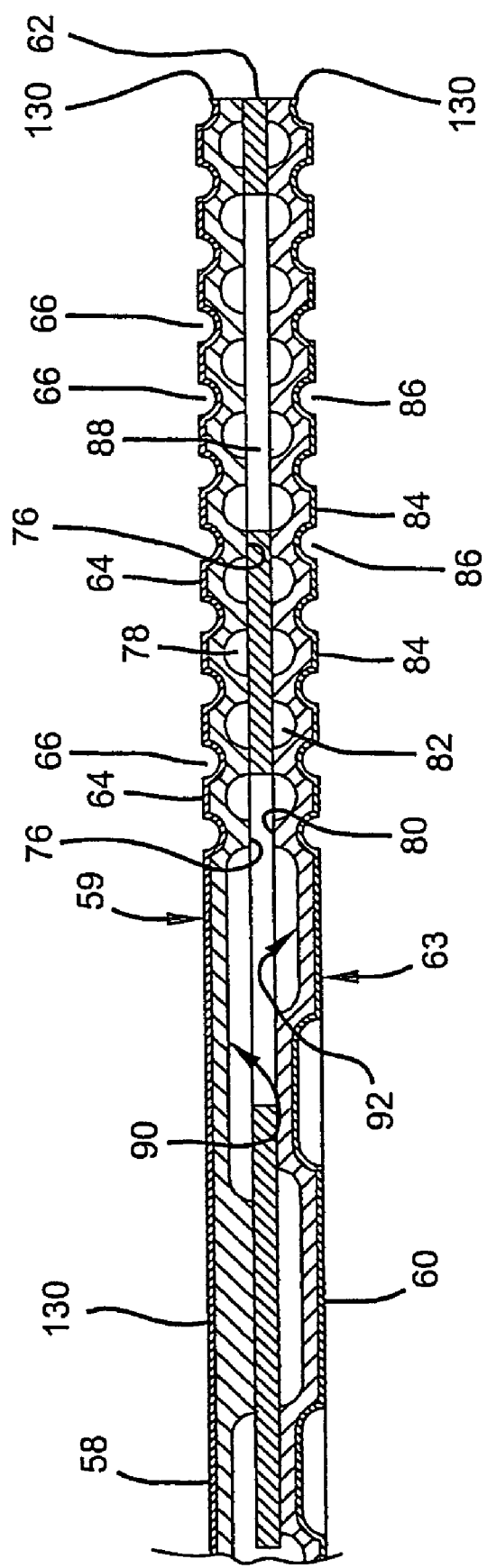
FIG. 3 is a partial cross-sectional view of a preferred embodiment according to the present invention in the direction of 3-3 of FIG. 2.

As best shown in FIG. 3, the underside of the sheet 58 includes a plurality of ridges 76 which define therebetween a plurality of channels 78 through which coolant passes during the operation of the fuel cell. A coolant channel 78 underlies each land 64 while a reactant gas groove 66 underlies each ridge 76. Alternatively, the sheet 58 could be flat and the flow field formed in a separate sheet of material. Sheet 60 is similar to sheet 58. The internal surface 61 (i.e., coolant side) of sheet 60 is shown in FIG. 2.

FIG. 3 depicts a plurality of ridges 80 defining therebetween a plurality of channels 82 through which coolant flows from one side 69 of the bipolar plate to the other 71. The external side of the sheet 60 has a major surface 63 having a plurality of lands 84 thereon defining a plurality of grooves 86 or flow channels through which the reactant gases pass. An interior spacer sheet 62 is positioned interjacent the exterior sheets 58, 60 and includes a plurality of apertures 88 therein to permit coolant to flow between the channels 82 in sheet 60 and the channels 78 in the sheet 58 thereby breaking laminar boundary layers and affording turbulence which enhances heat exchange with inside surfaces 90, 92 of the exterior sheets 58, 60 respectively.

As recognized by one of skill in the art, the fluid distribution element/current collectors of the present invention may vary in design from those described above, such as for example, in the configuration of flow fields, placement and number of fluid delivery manifolds, and the coolant circulation system, however, the function of fluid transport and conductance of electrical current through the surface and body of the current collector functions similarly between all designs. The exemplary flow channel geometry is semi-circular; in practice, this geometry may be, for example, square, rectangular, triangular, or other variations thereof, that can reasonably be attained through available manufacturing processes.

Typically, based on the geometry, channels with straight flow paths permit a lower differential pressure across the flow field, compared to complex and convoluted flow patterns. Although the gas flow field channels 66, 86 may comprise linear rows, certain designs may require non-linear channels, especially where greater fluid turbulence and mixing is necessary. These complex flow fields are typically formed to accommodate ducts for three fluids (hydrogen, air and coolant). The present invention is particularly useful where an element has complex flow field channel 66, 86 patterns (e.g. serpentine flow field patterns having "U-bends" and curves). One aspect of the present invention, is to reduce water accumulation and thus prevent plugging of the gas flow field channels 66, 86.

Thus, in accordance with the present invention, one or more regions of the flow channels or grooves 66,86 of the major surfaces 59,63 of the bipolar plate are overlaid with a super-hydrophilic corrosion-resistant layer 130. The present invention is also applicable to other conductive elements in a fuel cell which contact fluids, such as terminal collector end plates like the exemplary ones shown in FIG. 1 as 10 or 12. The super-hydrophilic corrosion-resistant layer 130 is preferably deposited on one or more regions of the surface 59,63, preferably corresponding to the grooves 66,86, which correspond to the flow channels or portions of the flow channels in the flow field. It is preferred that the polymer layer 130 is minimized or not present on the electrically conductive lands 64,84.

Preferred materials of construction for the fluid distribution element separator plate 56 include conductive metals, such as stainless steel, aluminum, and titanium, for example. Exemplary suitable materials are 316L, 317L, 256 SMO, Carpenter 20, Inconel 601, Alloy 276, and Alloy 904L. Bipolar plates can also be constructed of polymeric matrices, such as those exemplary polymeric composite bipolar plates disclosed in U.S. Publication Nos. 2004/0253505 to Blunk et al. and 2005/0001352 to Chen-Chi Martin Ma et al. as well as U.S. Pat. No. 6,248,467 to Wilson et al., all of which are incorporated herein by reference in their entirety.

The operating conditions in a fuel cell are frequently harsh and highly corrosive. In an $H_2$—$O_2$/air PEM fuel cell environment, the bipolar plates and other contact elements (e.g., end plates) are in constant contact with highly acidic solutions (pH 3-5) containing $F^-$, $SO_4^{2-}$, $SO_3^-$, $HSO_4^-$, $CO_3^{2-}$, and $HCO_3^-$, etc. Moreover, the cathode operates in a highly oxidizing environment, being polarized to a maximum of about +1 V (vs. the normal hydrogen electrode) while being exposed to pressurized air. Finally, the anode is constantly exposed to super atmospheric hydrogen. Hence, contact elements and polymeric coatings within the fuel cell must be resistant to acids, oxidation, and hydrogen embrittlement in the fuel cell environment. One known super-hydrophilic coating is silicon dioxide; however, it can potentially suffer from acid attack (HF) within the fuel cell and potentially degrades over time. Fluoropolymers, in particular, fluorohydrocarbon polymers such as polytetrafluoroethylene (PTFE) are inert, stable and corrosion-resistant in a fuel cell environment; however, such fluoropolymers are typically very hydrophobic.

In accordance with the principles of the present invention, it appears that extremely hydrophilic surfaces in flow fields of fluid distribution elements are advantageous, in that they facilitate a very low profile film of water along the surface. This low water profile is particularly advantageous during low fluid flow rate conditions, and prevents high profile plugs that potentially block the channels and potentially flood the cathode. Thus, in various embodiments of the present invention, a previously hydrophobic fluoropolymer is surface-modified to render it highly hydrophilic, while still retaining its porous morphology, inertness, and corrosion-resistance in the fuel cell environment. Surface modification of the hydrophobic fluoropolymer will be discussed in more detail below.

Thus, in preferred embodiments of the present invention, the super-hydrophilic polymer is a fluoropolymer that preferably increases the hydrophilicity (e.g., increases the surface energy) of the coated region(s) to reduce liquid accumulation as fluid flows through the flow field, as compared to the degree of liquid accumulation in the flow field if it were uncoated.

Fluoropolymers suitable for use with the present invention include any polymer which contains fluorine as an appended group. Typical fluoropolymers include but are not limited to homologues and derivatives of polytetrafluoroethylene, fluorinated ethylene-propylene copolymers, tetrafluoroethylene, PFA-perfluoroalkoxy resin, modified copolymers of ethylene and tetrafluoroethylene and the like. Other exemplary fluoropolymers are those polymers prepared from perfluorinated α-fluoroolefin monomers containing hydrogen atoms as well as fluorine atoms. The α-fluoroolefin has 2 to 6 carbon atoms. Typical α-fluoroolefins include but are not limited to perfluorinated α-fluoroolefins such as tetrafluoroethylene, hexafluoropropene, perfluorobutene-1, perfluoroisobutene and the like, and hydrogen containing α-fluoroolefins such as trifluoroethylene, vinylidene fluoride, vinyl fluoride, pentafluoropropane and the like, and halogen containing α-fluoroolefins such as trifluorochloroethylene, 1,1-difluoro-2,2 dischloroethylene, 1,2-difluoro-1,2 dischloroethylene, trifluorobromoethylene and the like, and perfluoroalkoxyethylene polymers.

In accordance with various embodiments of the present invention, a particularly preferred polymer for the super-hydrophilic corrosion-resistant layer is polytetrafluoroethylene (PTFE) and derivatives thereof. PTFE is commercially available from E. I. DuPont De Nemours & Company of Wilmington, Del. as the product TEFLON®. In certain embodiments, a highly porous PTFE is desirable. To impart porosity, PTFE can be expanded or can have a high degree of cross-linking by branching, as is well known in the art. Porosity is also provided by physical methods of radiation, such as laser beam of precise focal beams. Expanded polytetrafluoroethylene (ePTFE) is typically microporous (i.e., a majority of the pores are less than 2 nm) and its characteristics are described in U.S. Pat. No. 3,953,566 that is incorporated by reference in its entirety. The super-hydrophilic polymer of the present invention is preferably selected to maintain its integrity at temperatures up to about 200° C.

Unless otherwise indicated, "pore size" refers to an average or median value including both the internal and external pore diameter sizes. The terms "pore" and "pores" refers to pores of various sizes, including so-called "macropores" (pore size greater than 50 nanometers (nm) diameter), "mesopores" (pore sizes having diameter between 2 nm and 50 nm), and "micropores" (pore sizes less than about 2 nm or 20 Angstrom diameter). In various embodiments, the super-hydrophilic polymer forming the layer is preferably highly porous. Preferably, the polymer layer has greater than 40% pores, more preferably greater than 50% pores, more preferably greater than 60% pores, and more preferably greater than 70% pores. In certain embodiments, the porosity of the super-hydrophilic polymer is between about 70 to about 85% porosity.

In accordance with various embodiments of the present invention, a fluoropolymer is surface-modified to impart hydrophilicity. For example, plasma activation using non-polymer forming gases such as oxygen, ammonia, nitrogen and/or saturated fluorocarbons chemically modifies a polymer substrate surface. The plasma activation of a fluoropolymer substrate surface with oxygen gas, for example, can result in the replacement of fluorine atoms from the substrate surface with oxygen in order to enhance the wettability of that surface. The reactive gas plasma preferably modifies the fluoropolymer surface by the chemical reaction of the plasma with the fluoropolymer surfaces, and not from the electrical field created by ion bombardment of high energy particles in the region of a cathode of the plasma generator.

In such a manner, a fluoropolymer starting material can be permanently modified by substitution of a portion of the original fluorine functionality with oxygen and/or hydrogen containing groups covalently bonded directly to the carbon polymer backbone. By regulating amounts and ratios of carbon, fluorine, oxygen and hydrogen in the modified polymer, surface energy can be increased from that of the original material along with wettability without materially altering the polymer's original surface morphology (e.g., porosity) and bulk characteristics (e.g., inertness). For example, by plasma treatment, the fluoropolymer compositions are unique in that a controllable amount from about 1 to about 98% of the fluorine atoms of the starting polymer's surface interface are permanently removed and replaced with hydrogen atoms and with oxygen atoms or low molecular weight oxygen-containing functionalities, so that such substituents are covalently bonded directly to the carbon backbone polymer chain to a desired depth into the bulk of the polymer layer during treatment, such as 0.01 µm. Oxygen functionality may take the form of oxo, hydroxyl, alkoxy, like methoxy, ethoxy and propoxy or R'—CO— or combinations thereof where R' is hydrogen or alkyl, and particularly $C_1$-$C_5$ lower alkyl, including methyl, ethyl, propyl, isopropyl, and so on. Additionally, the functional groups may include some nitrogen containing groups. In certain embodiments, the oxidation creates one or more polar functional groups selected from the group: hydroxyl groups, carbonyl groups, and mixtures thereof. In essence, the surface modification to impart hydrophilicity is believed to generate a highly oxidized surface of the polymer, where oxygen replaces a portion of the fluorine atoms to a certain depth. Further, the oxidation also creates other changes to the chemistry of the fluoropolymer, such as carbon-carbon bonding and carbon-hydrogen bonding, which likewise enhance hydrophilicity.

Accordingly, by surface modification with plasma treatment, the porous fluoropolymers are rendered super-hydrophilic having far greater surface wettability and free energy enhancement while still substantially preserving the inert properties of the polymer and microstructural morphology, e.g., membranous structure, pore size, surface roughness on a molecular scale, etc.

In one embodiment, the surface-modified porous super-hydrophilic polytetrafluoroethylene is commercially available from Advantec MFS, Inc. of Dublin, Calif., as H050A047A, a hydrophilic polytetrafluoroethylene. This material is highly porous, having a porosity of about 50-60%, with an average pore size of 0.5 µm and has a static contact angle of 15°, a dynamic advancing and receding angles of contact angle of 70 and 0° (Wilhelmy method). High resolution window scans were acquired of the C 1s and F 1s photoelectron peaks by X-ray Photoelectron Spectroscopy (XPS). In Table 1, the Advantec sample of super-hydrophilic surface-modified PTFE material is designated Example 1 and a hydrophobic conventional PTFE (TEFLON® available from W. L. Gore) is designated Control were tested and results are shown in Table 1 below. Atomic percentages provided below exclude hydrogen (H).

TABLE 1

| Sample | Carbon | Fluorine | Oxygen | Ratio of F:C |
|---|---|---|---|---|
| Control | 32 | 68 | 0.4 | 2:1 |
| Example 1 | 41 | 50 | 9 | 1:2 |

Figure 4:
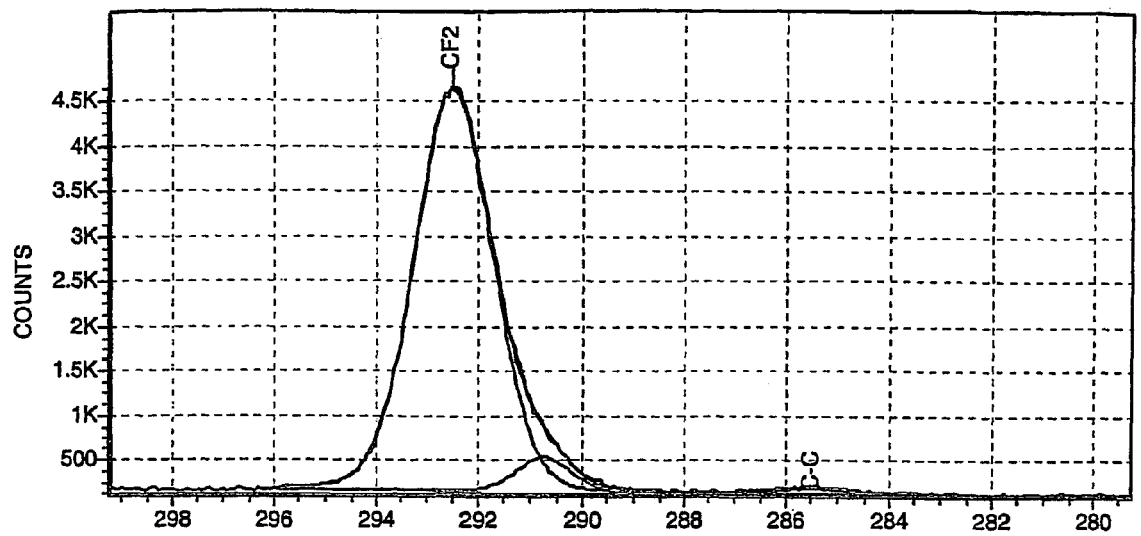
FIG. 4 is a high resolution window scan FTIR analysis on a super-hydrophilic polytetrafluoroethylene (PTFE) for use in various embodiments of the present invention.
Figure 4:
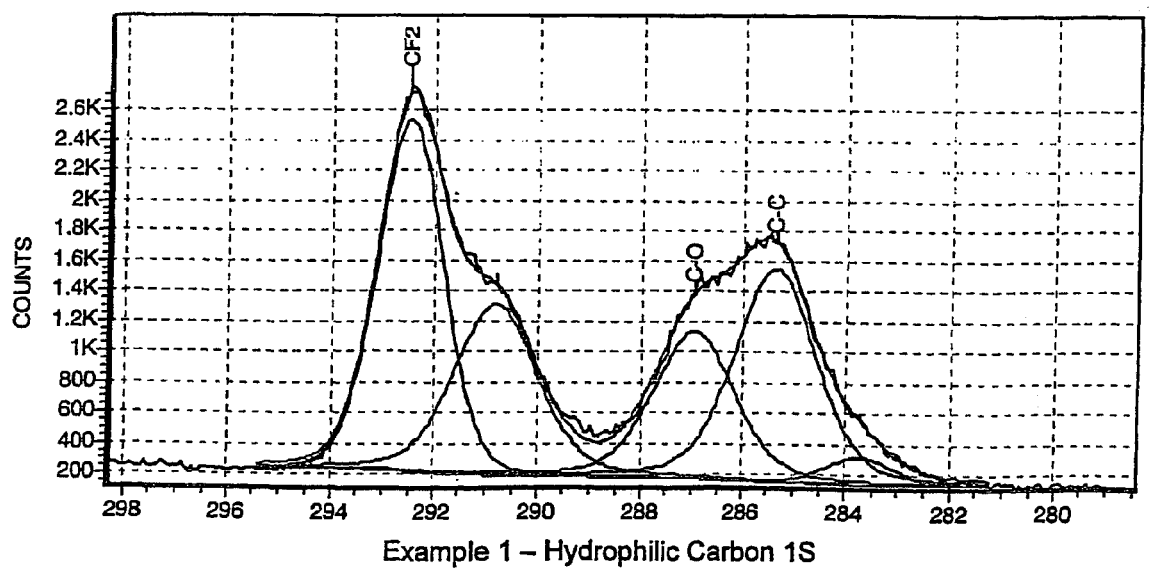

The results show that the hydrophilic Example 1 has increased carbon and oxygen, and decreased fluorine from the Control, showing the oxidation and substitution of oxygen for fluorine occurring after plasma treatment. Carbon 1s survey scan results for the control and modified PTFE are shown in FIG. 4. The $CF_2$ adjusted peaks occur around 292.48 eV. The C—C peaks occur around 258.388 eV. The C—O bond peaks occur at around 286.972 eV. As can be observed, the Control, which is traditional hydrophobic PTFE, has predominantly C—F bonding, with a small amount of C—C bonding. However, the Carbon is profile of Example 1 surface-modified PTFE is chemically significantly distinct, showing a much higher level of C—O and C—C bonding, demonstrating the chemical modification and oxidation that occurs by plasma activation at the surface.

A comparative FTIR analysis was also performed on Example 1 and Control via an attenuated total reflection (ATR). The IR spectra showed the surface properties of the modified-PTFE have strong bands of PTFE and weak bands of hydroxyl group and other functional moieties. However, the IR spectra from the bulk of the material showed only PTFE bands, thus indicating that modifications occur only along the surface. The surface treatment can be controlled by the duration of treatment. The surface-modified portion of the layer extends to a predetermined depth (e.g., 0.1 μm) into the bulk of the polymer layer.

The present invention also provides a fuel cell containing an impermeable electrically conductive fluid distribution element having a super-hydrophilic corrosion-resistant layer comprising a fluoropolymer along one or more regions. The fuel cell contains the fluid distribution element defining a fluid flow field, where the flow field faces a membrane electrode assembly (MEA) and is adjacent to a gas diffusion media. At least one region of the major surface of the fluid distribution element has the hydrophilic coating on the flow field susceptible to liquid accumulation. The present invention provides a hydrophilic coating on the flow field surface to aid in removing water to maintain stable performance of the fuel cell, i.e., the hydrophilic coating allows the fuel cell to operate without flooding by favoring the formation of thin water films that do not significantly impede the reactant gas flows.

Figure 5:
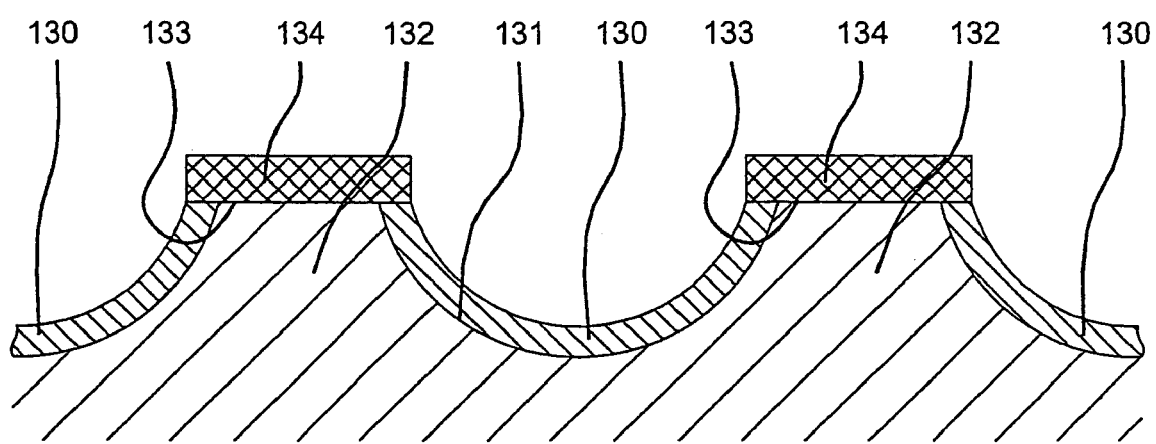
FIG. 5 is an alternate preferred embodiment of the present invention showing a magnified portion of the bipolar plate of FIG. 4.

The coating may be applied at any thickness effective to aid in fluid transport in the flow field, but preferably the super-hydrophilic layer is from about 50 nm to about 200 μm, more preferably from about 100 nm to about 200 nm. FIGS. 3 and 5 show the corrosion-resistant hydrophilic layer 130 deposited on the major surface 132 in the flow channel 131. The layer 130 may comprise one or more distinct layers to achieve this thickness. The layer 130 may be deposited on a first region at a first thickness, and on a second region with a second thickness. In preferred embodiments, the layer 130 thickness is selected to maintain the desired surface free energy and hydrophilicity while not adding excess material and weight to the fuel cell.

In certain embodiments, the present invention provides a method for manufacturing a fluid distribution element having a one or more regions overlaid with a hydrophilic polymer for a fuel cell. The method includes applying a polytetrafluroethylene (PTFE) polymer to one or more regions of a major surface of the fluid distribution element for the fuel cell. The method also comprises treating a surface of said polymer to impart hydrophilicity thereto.

The polymer or a polymer pre-cursor may be applied to one or more regions of the surface of the fluid distribution element. Polytetrafluoroethylene is formed by addition polymerization of tetrafluoroethylene monomers. Polymerization of the fluoropolymer monomers can be achieved by application of heat, plasma, irradiation, or via suspension or emulsion polymerization. Unsaturated fluorocarbon gas plasmas can be used, for example, to deposit and polymerize a fluorocarbon layer onto a substrate. In the present invention, it is preferred that the polymer is highly porous, which can be achieved by heating and physically stretching a PTFE film; by branching agents which promote cross-linking; or by radiation techniques. Thus, in certain embodiments, applying the polymer can occur by depositing the polymer precursor, or monomers, by spin coating, spraying, dipping, brushing, solution casting, plasma or ion-assisted chemical vapor deposition, or screen printing. In embodiments where a precursor is deposited, it can be polymerized on after depositing on the fluid distribution element. The applied monomer/polymer precursor mixture can be polymerized to form the polymer layer by applying radiation, heat, and/or plasma to concurrently chemically bind the coating layer to the plate surface and provide the desirably highly porous morphology. In some embodiments, the method comprises applying and polymerizing a PTFE precursor. The applying and polymerizing can be conducted simultaneously by plasma-enhanced chemical vapor deposition (CVD).

In other embodiments, the polymer layer can be pre-formed as a discrete film (e.g. by solvent casting, extrusion, etc.), and then laminated onto the one or more regions of the working surface 59, 63 of the contact element 58, 60, e.g., by hot rolling.

The methods of the present invention further contemplate surface modification or treating of the PTFE/ePTFE to enhance the hydrophilicity of the polymer layer. In various embodiments, the hydrophilicity is achieved by applying non-thermal energy, such as treating with plasma, to the surface having the polymer layer applied. Plasma activation is used with non-polymer forming gases such as oxygen, nitrogen, ammonia, hydrogen, methane, or saturated fluorocarbons to chemically modify a substrate surface. In some embodiments, plasma treatment is conducted in an atmosphere comprising one or more of oxygen, ammonia, and nitrogen. The plasma activation of a fluoropolymer substrate surface with oxygen gas, for example, can result in the replacement of fluorine atoms from the substrate surface with oxygen in order to enhance the hydrophilicity of the surface, as previously described above.

Non-thermal energy generators include, by way of example, a dielectric barrier discharge generator, a pulsed corona discharge-type plasma generator, silent discharge plasma generator, radio frequency, microwave generator, hot filament plasma generator, or combinations thereof. The plasma is desirably produced either by a radio frequency (rf) field or by microwave energy coupled to the natural resonant frequency of plasma electrons in a static magnetic field. A low-temperature plasma may be obtained by applying a voltage at gas pressures between about 50 mtorr to about 5 torr. The electrodes may be external or internal parallel planar electrodes. The energetic discharge environment is sufficient to decompose gas molecules into electrons, ions, atoms, free radicals, and molecules in ground and excited states. The net effect of interaction induces polymerization of the monomers and chemical bonding to the surface of the plate.

If the coating is applied by a method that results in coating being applied on lands of the flow field, the coating may be thin enough to allow current to flow through it. Optionally, the polymer that is applied on the lands may be removed, for example with a doctor blade, before polymerization, or the coating may be abraded from the lands after polymerization. Alternatively, the lands may be masked prior to application of the polymer where the polymer is deposited. Thus, in certain embodiments of the present invention, prior to the applying of the polymer, select regions distinct from the one or more regions having the polymer applied on the major surface are masked. As shown in FIG. 5, in certain embodiments of the present invention, select regions 133 of the conductive substrate element surface 59,61 are masked. The polymer layer regions 130 are thus applied only to the desired non-masked areas corresponding to the channels 131, while lands 132 underlying the mask remain uncoated. In such embodiments, it is preferred that certain select regions 133, such as lands 132 (such as 64 or 84 of FIG. 4) are masked. As one skilled in the art can appreciate, various portions of the conductive substrate (e.g., bipolar plate 56) may be masked prior to applying the polymer. After applying the polymer layer 130, the masks can be removed.

In various embodiments, the methods of the present invention further comprise removing the masking from the select regions 133 after treating, and then further applying an electrically conductive coating corrosion-resistant coating 134 to the select (previously masked) regions 133. The lands 132 or other masked areas can then optionally be coated with a coating 134 that is electrically conductive, oxidation resistant, and acid-resistant. Such coatings 134 may include a polymer matrix or various metals not susceptible to corrosion and oxidation. Such metals include noble metals, such as gold (Au), ruthenium (Ru), rhodium (Rh), palladium (Pd), silver (Ag), iridium (Ir), platinum (Pt), osmium (Os), and the like. Other metals include those that comprise chromium (Cr), titanium (Ti), or tin (Sn). Electrically conductive compounds comprising such metals include, by way of example, chromium nitride (CrN), doped-tin oxide (SnO), and doped titanium oxide (TiO). Corrosion-resistant electrically conductive polymer matrix films suitable for covering the lands or conductive areas of the conductive elements include those taught in U.S. Pat. No. 6,372,376 to Fronk et al. No. 6,887,613 to Lee et al.; and U.S. Patent Publication No. 2004/0091768 to Abd Elhamid et al., all of which are herein incorporated by reference in their entirety and generally disclose various conductive particles, such as carbon black and graphite, dispersed in polymeric binders, such as polyamide, polyimide, polyamide-imide, and poly vinyl ester.

Fuel cell assemblies prepared in accordance with the present invention are highly efficient and have enhanced performance, with enhanced low power stability, as well as improved cell performance and durability. The coated bipolar plate used in a separator assembly in an electrochemical fuel cell provides integrated and enhanced water management. Such water management functions include: moving water away from the wet areas of the cathode side of the fuel cell, where it is generated as a product in the fuel cell electrochemical reaction; moving water away from the wet areas of the anode side of the fuel cell, where it can reside as a result of condensation of water from the reactant gas stream or by back diffusion which results from a water concentration gradient across the MEA; preventing water build up in any curves or bends in the flow field by reducing fluid accumulation; and more fully enabling the internal transporting of water to any relatively dry areas along the cathode and/or anode side. In this manner, the present invention provides improved durability and a decrease in the risk of material degradation within the fuel cell. Further, the super-hydrophilic coatings of the various embodiments of the present invention are also inert in the fuel cell and do not have a potential to contaminate the MEA, and further protect the underlying fluid distribution element substrate from corrosion. The present invention provides long lifespan and high efficiency fuel cells.

The description of the above embodiments and method is merely exemplary in nature and, thus, variations that do not depart from the gist of the invention are intended to be within the scope of the invention. Such variations are not to be regarded as a departure from the spirit and scope of the invention.

What is claimed is:

1. A fluid distribution element for a fuel cell comprising:
an impermeable element having a major surface facing a membrane electrode assembly (MEA), wherein one or more regions of the major surface are overlaid with a super-hydrophilic corrosion-resistant layer comprising a super-hydrophilic fluoropolymer, wherein said layer has a porosity of greater than 40% and wherein the layer is surface-modified by plasma activation of a fluoropolymer to produce the super-hydrophilic fluoropolymer on its surface in a substitution of a portion of the original fluorine atoms with groups selected from hydroxyl groups, alkoxy groups, nitrogen-containing groups, carbonyl groups, and mixtures thereof.

2. The element of claim 1, wherein said major surface defines one or more flow channels for transporting gas and liquid to and from the MEA and said one or more regions are overlaid with said super-hydrophilic corrosion-resistant layer corresponding to said flow channels.

3. The element of claim 2, wherein said major surface is patterned with a plurality of grooves and lands and said one or more flow channels correspond to said grooves, wherein one or more of said lands are overlaid with an electrically conductive corrosion-resistant coating.

4. The element of claim 1, wherein said super-hydrophilic corrosion-resistant layer has a static contact angle of less than or equal to about 20°.

5. The element of claim 1, wherein said fluoropolymer comprises polytetrafluoroethylene (PTFE).

6. The element of claim 5, wherein said PTFE is surface-modified by plasma activation with oxygen to replace fluorine atoms with oxygen atoms.

7. The element of claim 6, wherein said super-hydrophilic fluoropolymer comprises surface-modified PTFE wherein the surface modification comprises covalently bonded groups selected from the group consisting of hydroxyl groups, carbonyl groups, nitrogen-containing groups, and combinations thereof.

8. The element of claim 7, wherein the covalently bonded groups selected from the group consisting of hydroxyl groups, carbonyl groups, and combinations thereof.

9. The element of claim 1, wherein said layer has pores with an average pore of between about 0.05 to about 5 μm.

* * * * *